(12) United States Patent
Rao et al.

(10) Patent No.: US 8,223,699 B2
(45) Date of Patent: Jul. 17, 2012

(54) METHOD AND APPARATUS FOR DETECTING AND IDENTIFYING SPECTRUM OPPORTUNITIES

(75) Inventors: Yadunandana N. Rao, Sunrise, FL (US); Apoorv Chaudhri, Sunrise, FL (US); Robert J. Corke, Glen Ellyn, IL (US); Trefor J. Delve, Lake Zurich, IL (US); Daniel G. Prysby, Sleepy Hollow, IL (US); Christopher G. Ware, Chicago, IL (US); Michael F. Zeleznik, LaGrange Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1249 days.

(21) Appl. No.: 11/694,808

(22) Filed: Mar. 30, 2007

(65) Prior Publication Data

US 2008/0240024 A1    Oct. 2, 2008

(51) Int. Cl.
*H04W 4/00*    (2009.01)
*H04W 72/00*    (2009.01)
(52) U.S. Cl. .................... 370/329; 370/330; 455/450
(58) Field of Classification Search .................. 370/329, 370/330; 455/450
See application file for complete search history.

(56) References Cited

U.S. PATENT DOCUMENTS

| | | | |
|---|---|---|---|
| 6,990,087 B2 | 1/2006 | Rao et al. | |
| 2004/0087310 A1* | 5/2004 | Williamson et al. | 455/450 |
| 2006/0077938 A1 | 4/2006 | Alapuranen | |
| 2007/0135150 A1* | 6/2007 | Ushiki et al. | 455/509 |
| 2010/0035550 A1* | 2/2010 | Gao et al. | 455/47 |

FOREIGN PATENT DOCUMENTS

EP    1750466 A1    2/2007

OTHER PUBLICATIONS

PCT International Search Report Application No. PCT/US2008/056567 Dated Aug. 6, 2008—13 Pages.
European Office Action mailed on Jul. 28, 2010 for Application No. EP08731932.
English Translation of KIPO's Notice of Preliminary Rejection dated Mar. 8, 2011.
International Preliminary Report on Patentability and Written Opinion mailed on Oct. 15, 2009 for International Application No. PCT/US2008/056567.
Corresponding Canadian Application No. 2679677—Office Action dated Jan. 4, 2012.

* cited by examiner

*Primary Examiner* — Kamran Afshar
*Assistant Examiner* — Omoniyi Obayanju
(74) *Attorney, Agent, or Firm* — Barbara R. Doutre

(57) ABSTRACT

A method (20,200) and apparatus (10) for detecting and identifying spectrum opportunities, including the steps of communicating a location of at least one node (12) to at least one base station (14) (24), transmitting a list of at least one channel from the at least one base station (14) to the at least one node (12) (26), and sensing the at least one channel from the list by the at least one node (12) (34). The method (20,200) also includes the steps of determining if the at least one channel is in use, and if the at least one channel is in use, determining the user of the at least one channel that is in use (38).

16 Claims, 4 Drawing Sheets ated in the 50-300 MHz frequency spectrum. The specific
METHOD AND APPARATUS FOR DETECTING AND IDENTIFYING SPECTRUM OPPORTUNITIES

FIELD OF THE INVENTION

The present invention relates generally to a method and apparatus for detecting and identifying spectrum opportunities and more particularly to spectrum opportunity detection and network protocol identification in a cognitive radio apparatus.

BACKGROUND

Those skilled in the art will recognize that the radio frequency (RF) spectrum is divided into specific frequency bands where certain electronic devices typically transmit and/or receive within a certain frequency band. For example, amplitude modulated (AM) radio broadcasts are transmitted in the 300-1700 KHz frequency spectrum, and frequency modulated (FM) radio and television broadcasts are transmitted in the 50-300 MHz frequency spectrum. The specific frequency that the device is using to transmit and/or receive the signals is typically referred to as a "channel."

Throughout the specific bands of frequencies that these devices use, there are portions of the frequency spectrum that remain un-utilized. Additionally, the use of specific channels within the frequency band can change depending on the time and/or location of the user. For example, a television or radio broadcast may only transmit a signal on a channel at certain times of the day. Similarly, the same television or radio broadcast may only transmit a signal on that channel in a particular area or region and not in another area or region.

Many differing types of algorithms can be used for sensing these unused frequencies. These algorithms include those types that sense the received data using a radiometer and coherent detectors. An example of such a method is U.S. Pat. No. 6,990,087, entitled "DYNAMIC WIRELESS RESOURCE UTILIZATION." This reference discloses the detection of spectrum gaps or "holes" that are modeled in order to predict future opportunities for frequency re-use. However, one drawback in using these types of techniques are that the prediction apparatus can be very unpredictable or erroneous if the data is not pre-conditioned due to RF front end overload or analog-to-digital converter (ADC) saturation occurring in the receiver.

Further, determining only whether the channel is being used, without determining additional information about channel operational status can generally result in false alarms that the channel is unavailable. If only channel use is determined, whether that channel is in actual use or not, can result in a high probability of false alarms. This occurs since an "in use" determination is made disregarding whether another user may be able to co-exist with or transmit over the current user.

Therefore, the need exists to develop a system and method that includes data conditioning for improving the detection probability or opportunity to re-use a frequency on a non-interfering basis where the obtained information can reduce false alarm probability.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
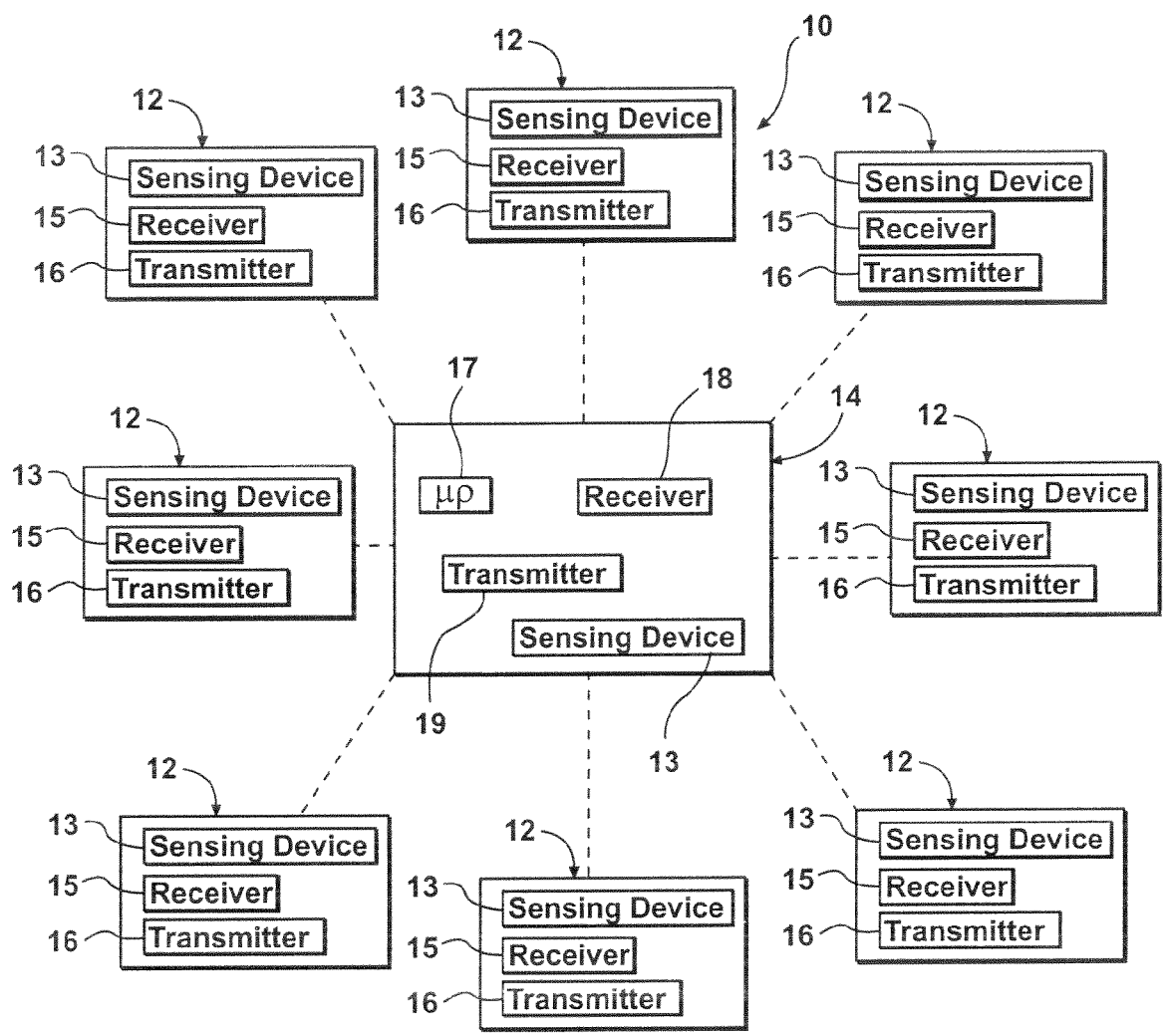
FIG. 1 is a block diagram illustrating the apparatus of spectrum opportunity detection in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to detecting and identifying spectrum opportunities to re-use a frequency or channel on a non-interfering basis. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of detecting and identifying spectrum opportunities described herein. The non-processor circuits may include, but are not limited to, a radio receiver, a radio transmitter, signal drivers, clock circuits, power source circuits, and user input devices. As such, these functions may be interpreted as steps of a method to perform the detection and identification of spectrum opportunities. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions, programs, and ICs with minimal experimentation.

In reference to FIG. 1, an apparatus for spectrum opportunity detection and network protocol identification 10 is illustrated in accordance with an embodiment of the present invention. Typically, the apparatus 10 is used with or includes a cognitive radio. Those skilled in the art will recognize that a cognitive radio is a paradigm for wireless communication in which either a network or a wireless node changes its transmission or reception parameters to communicate efficiently without interfering with licensed users. This alteration of parameters is based on the active monitoring of several factors in the external and internal radio environment, such as radio frequency spectrum, user behavior, and network state. The apparatus 10 includes at least one node 12 that is in communication with at least one base station 14. Typically, the nodes 12 are subscribers of the communication network, such as, but not limited to, a two way radio transceiver and/or cellular telephone subscriber. The base station 14 communicates to all of the nodes 12 within a predetermined area. In an alternate embodiment, the base station 14 can also be a master node operating in an ad-hoc network mode.

Generally, the node 12 includes at least a sensing device 13, a receiver 15, and a transmitter 16 while the base station 14 includes at least a microprocessor 17, a receiver 18, and a transmitter 19. Those skilled in the art will also recognize that the base station 14 may also include the sensing device 13. As described in greater detail herein, the transmitter 19 transmits a list of at least one channel that is received by the receiver 15 of the node 12. The sensing device 13 is used to scan or sense the channels on the list in order to determine if the channels are in use. Typically, the sensing device 13 includes at least one RF receiver circuit, such as a receiver front end and at least one microprocessor. The transmitter 16 transmits this in use channel information known as "soft" information to the base station 14 that is received at receiver 18 and is processed by the microprocessor 17. The nodes 12 and base station 14 are used to determine if a channel within the frequency spectrum is being used. If the channel is in use then the nodes 12 and base station 14 also identify the user of the frequency. Thus, the apparatus 10 operates both as a spectrum opportunity detector, such that it determines if the channel is currently in use, and as a network or protocol detector to also determine the user of the channel.

Figure 2:
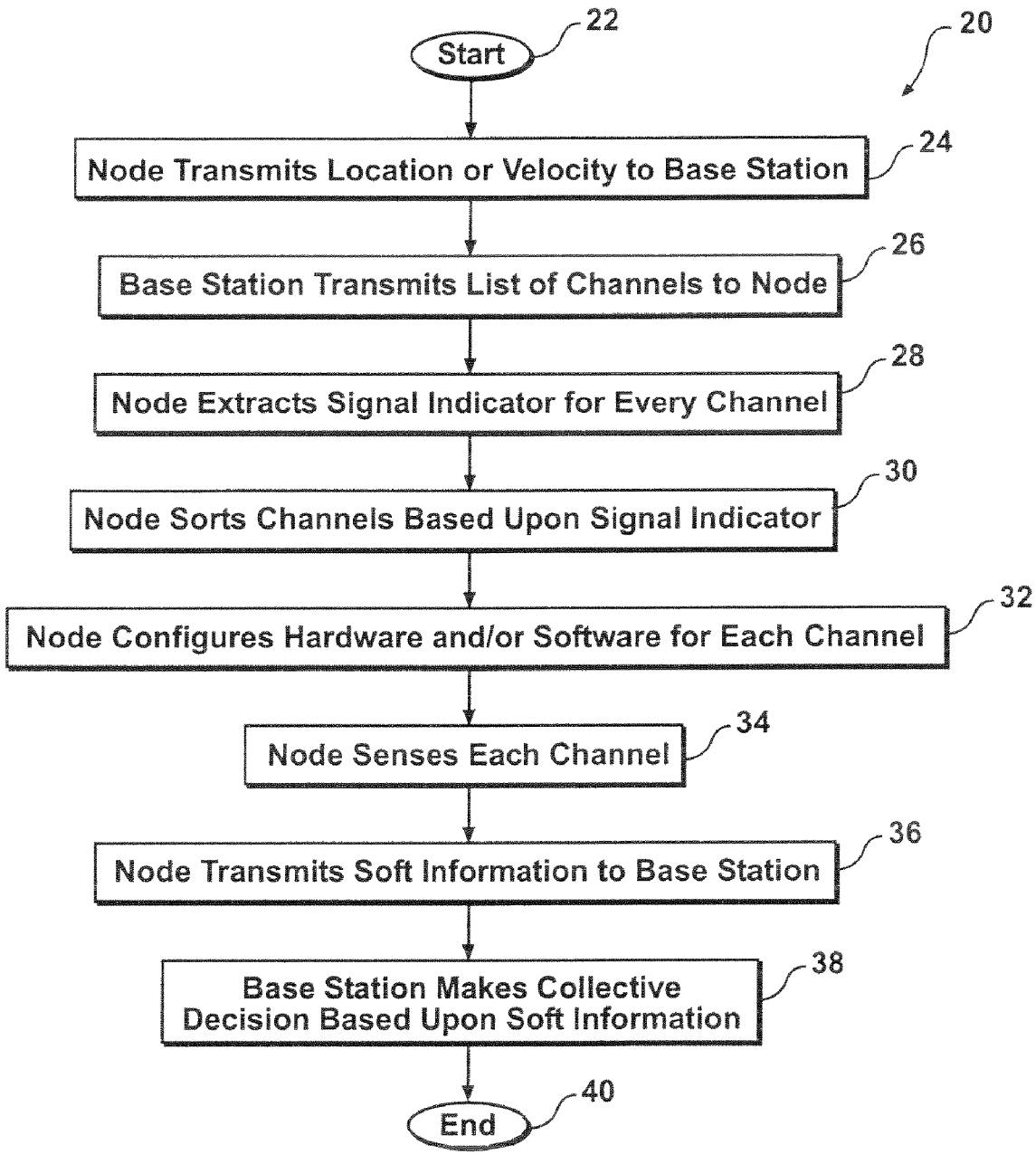
FIG. 2 is a flow chart diagram illustrating an example of a spectrum opportunity detection method in accordance with an embodiment of the present invention.

Referring to both FIGS. 1 and 2, a method 20 of detecting and identifying spectrum opportunities includes starting the process 22 and then transmitting 24 a location of the node 12 to the base station 14. When mobile, the node 12 can also transmit its velocity. The base station 14 then transmits 26 a list of channels to the node 12. Typically, the channels listed in the list of channels are the channels that are to be sensed for activity. The list of channels can be based upon factors such as known data, such as broadcast activity of a licensed user of a frequency, data obtained by other nodes 12 and transmitted to the base station 14, and/or a history of data collected by any number of nodes 12. The list of channels may also be based upon a spectrum that can be used by the network on a secondary basis.

The process then continues where the node 12 extracts 28 a signal indicator or signal indicator data for every channel that is included in the list. Thus, the signal indicator is included in the list of channels that is transmitted from the base station 14 to the node 12. Next, the node 12 sorts 30 the channels based upon the signal indicator. The node 12 then configures 32 the hardware and/or software of the node 12 for each channel. Typically, the receiver hardware and/or software in the node 12 is configured based upon the signal indicator obtained from the base station 14. Configuring the node 12 can include, but is not limited to, configuring the automatically adjusted gain parameters, including external attenuators, configuring demodulator settings, configuring a crystal filter, configuring an equalizer filter, configuring other components of the hardware, configuring the software of the node 12, or the like, and/or combinations thereof. Examples of configuring the hardware and/or software of the node 12 are described in greater detail below.

The process then proceeds where the node 12 senses 34 each channel. Typically, the nodes 12 begin to sense or scan the channels based upon the signal indicator. However, the nodes 12 can alter the sensing parameters or algorithm based upon soft information. The node 12 determines if the channel is in use, and if the channel is in use, then the node 12 further determines the user of the channel. If the channel is in use, then the node 12 determines if the user is a licensed primary user, a licensed secondary user, or an unlicensed secondary user. The node 12 then transmits 36 soft information to the base station 14. The soft information includes, but is not limited to, whether the channel is being used, and if the channel is being used, the user of the channel, and other data that the node 12 obtains, as described in greater detail below.

Next, the base station 14 makes a collective decision 38 based upon the soft information received from the node 12. Thus, the base station 14 determines that if the channel is not being used then the node 12 can use the unused channel, or if the channel is being used whether the node 12 can co-exist with the licensed secondary user or unlicensed secondary user. Also, the base station 14 can determine if the node 12 can use the channel over the user when the user is a secondary user or an unlicensed secondary user. Therefore, the node 12 and base station 14 not only determine whether the frequency is in use, but also the user that is using the channel. The process ends 40 when these determinations are completed.

Each individual channel is associated with a different signal indicator. The signal indicator can be derived based upon the collective information received from the individual nodes 12, such as the location of the node 12, the velocity of the node 12 if the node 12 is mobile, a history or previous sensing results of any number of nodes 12 or soft information, the strength of the signal, a knowledge base stored in the base station 14 regarding the location of primary licensed users and other secondary user or unlicensed secondary users operating in that frequency band, local scatterer information, the like, or a combination thereof. Thus, the data transmitted from the base station 14 to the node 12 for which the node 12 senses the channels is based upon collective data from other nodes and a history of data collected by all nodes 12 in that location or area. Typically, the signal indicator data is transmitted from the base station 14 to the node 12, and the soft information is transmitted from the nodes 12 to the base station 14.

When the node 12 sorts the channels based upon the signal indicator 30, it allows for the node 12 to minimize the number of hardware and/or software configurations, and thus, the overall sensing time of the configuration 32. By way of example but in no way limiting, the node 12 may sort the list of channels in order of the highest signal indicator to the lowest signal indicator. Since the node 12 configures the hardware and/or software for each individual channel, when similar channels are grouped with one another, the hardware and/or software configurations of the node 12 are minimized. Further, the sensing time for sensing the channels 34 can be based upon the signal indicator, where higher sensing times are required for channels with little activity.

The soft information can include, but is not limited to, whether the channel is being used, and if the channel is being used, the user of the channel, the sensing algorithm that is being used by the node 12, the sensing algorithm parameters adopted by the node 12, extracted signal features, key markers within the data that affected the result of the decision of the base station 14, extracted data that can be used to identify the user, operating channel characteristics, the like, or a combination thereof. The sensing algorithm used by the node 12 can be included in the soft information in order for the base station 14 to have knowledge of the type of sensing algorithm. Since multiple algorithms can be used by the node 12 to sense the channels, it can be beneficial for the type of algorithm used by the node 12 to be transmitted to the base station 14 so that the base station 14 has knowledge of how the node 12 obtained the data. Additionally, the sensing algorithm parameters can be included in the soft information. The algorithm parameters can affect the results of the channel sensing by the node 12, which can ultimately affect the decision made by the base station 14. Thus, if the base station 14 is aware of the algorithm parameters, the base station 14 can make intelligent decisions based upon the soft information, including the algorithm parameters, which can affect the results of the sensing done by the node 12.

The soft information can also include extracted signal features and key markers within the data that resulted in the decision. The signal features and/or the key markers can be used to identify the type of signal that is being broadcast in a channel by another user. Having the ability to determine the type of signal being broadcast can assist in identifying the user of the channel, the network, and/or the protocol. Thus, the base station 14 can identify the user, which can assist in the base station 14 determining if the user is a primary user, a licensed secondary user, or an unlicensed secondary user, and whether the node 12 can co-exist or broadcast over the user. Further, the signal feature and/or key marker data can be compressed when being transmitted as part of the soft information in order to reduce the bandwidth of the soft information. Thus, the base station 14 can have the necessary software to recognize and/or decode the compressed data.

Additionally, the soft information can include an extracted symbol rate if the signal being broadcast in the channel is a digital signal. The symbol rate can be used by the node 12 and/or the base station 14 to determine what type of signal is being broadcast in the channel. Knowing the type of signal being broadcast can assist the node 12 and/or base station 14 in determining the user of the channel, and assist the base station 14 in determining if the node 12 can co-exist or broadcast over the user. Likewise, a pilot frequency can be extracted from the signal being broadcast, which can identify the type of signal being broadcast. As stated above, this information can assist the node 12 and/or base station 14 in determining the user of the channel. Also, spectral content can be extracted from the signal being broadcast in order to identify the type of interferer.

The soft information can further include operating channel characteristics of the signal being broadcast in the channel. For example, different nodes 12 can have different bandwidth capabilities due to location, surroundings, hardware, and the like. The operating channel characteristics can affect the demodulation of the signal and/or the identification results obtained by the node 12 when sensing the channels. This information can assist the base station 14 when determining if the node 12 can broadcast a signal in a channel, such as co-existing with the user or transmitting over the user.

It should be appreciated by those skilled in the art that any combination of or all of the above types of data, including other suitable types of data or information that could be used to determine the type of signal or the user of the channel, can be included in the soft information that is transmitted between the node 12 and the base station 14. It should further be appreciated by those skilled in the art that any combination of or all of the above types of soft information can be compressed in order to reduce or limit the bandwidth of the transmission between the node 12 and the base station 14.

The base station 14 can also transmit the collected soft information to a new node 12 that is new to the network. Typically, the soft information is included in the list of channels, which includes the signal indicator data that is transmitted from the base station 14 to the node 12. For example purposes only, and in no way limiting, if a node 12 enters the area or region of the base station 14, the base station 14 will transmit the collected soft information to the node 12 as part of the signal indicator data, so that the node 12 is aware of the spectral environment. When the node 12 is aware of the spectral environment, the node 12 can receive or have a list of spectral opportunities at the time the node 12 enters the network. The node 12 can also receive or have a list of available networks. The new node 12 can then choose a particular network or channel and configure the hardware accordingly.

Figure 3:
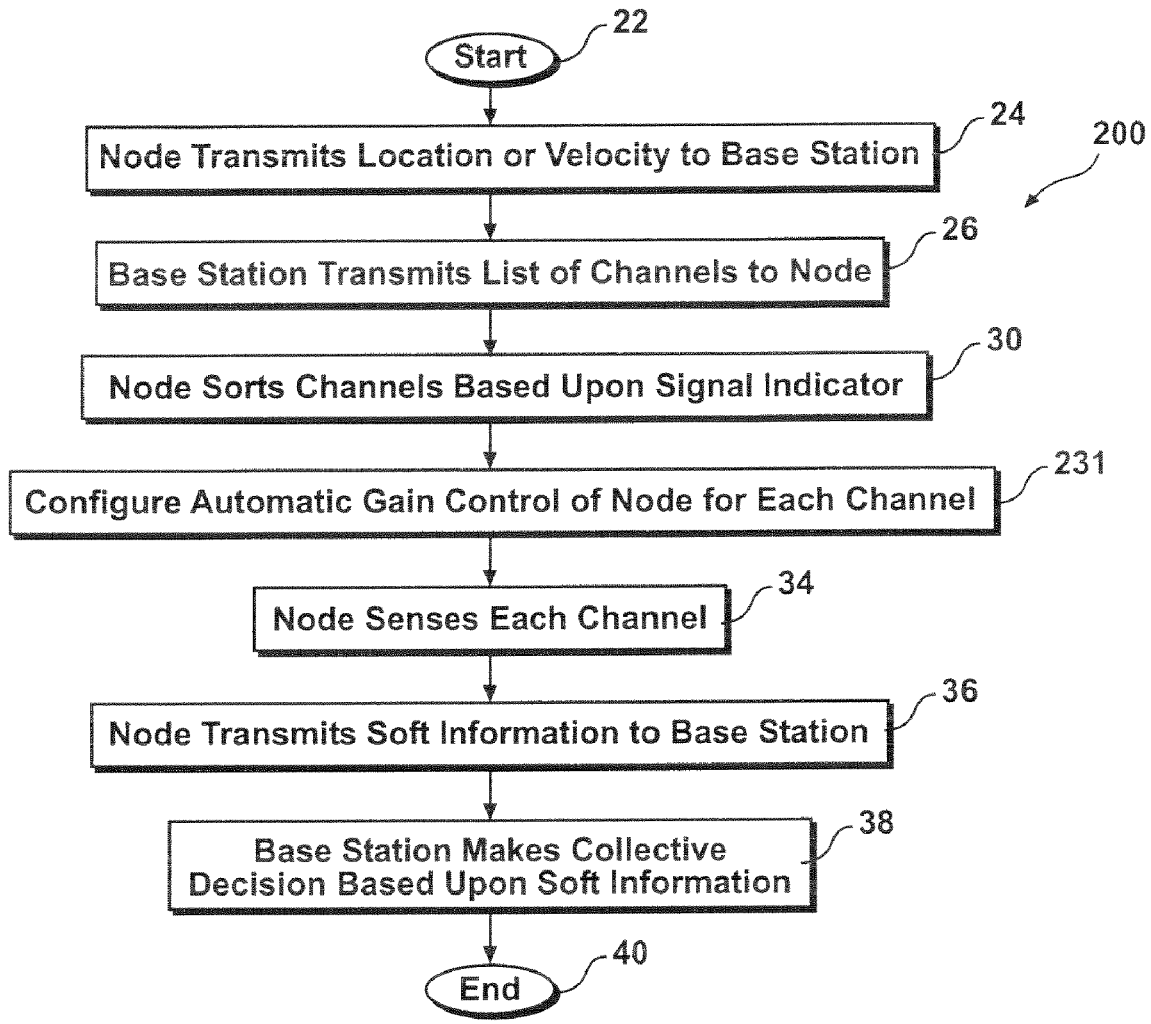
FIG. 3 is a flow chart diagram illustrating an example of a spectrum opportunity detection method where the automatic gain control (AGC) of a receiver in a node is configured in accordance with another embodiment of the present invention.

Alternatively, a method 200 for detecting and identifying spectrum opportunities is shown in FIG. 3. By way of explanation and not limitation, the method 200 configures the receiver hardware of the node 12 by configuring the automatic gain control (AGC) of the receiver hardware of the node 12. However, it should be appreciated by those skilled in the art that the node 12 can be configured by configuring a demodulator, a crystal filter, an equalizer filter, configuring the hardware of the node 12 based upon the signal indicator, configuring the software of the node 12, the like, or a combination thereof. The method 200 starts 22 and proceeds where the node transmits 24 the location or velocity of the node 12 to the base station 14. The base station 14 then transmits 26 a list of channels to the node 12. The node 12 then sorts 30 the channels based upon the signal indicator.

The method 200 then proceeds such that AGC of the node 12 is configured 231 for each channel. Typically, the AGC of the node 12 is configured based upon the signal indicator, as described in greater detail below. The node 12 senses each channel at step 34, after the AGC has been configured 231 for the channel that is being sensed. Next, the node 12 transmits 36 soft information to the base station 14. The base station 14 makes a collective decision 38 based upon the soft information and the method 200 ends 40 when this process is complete.

Figure 4:
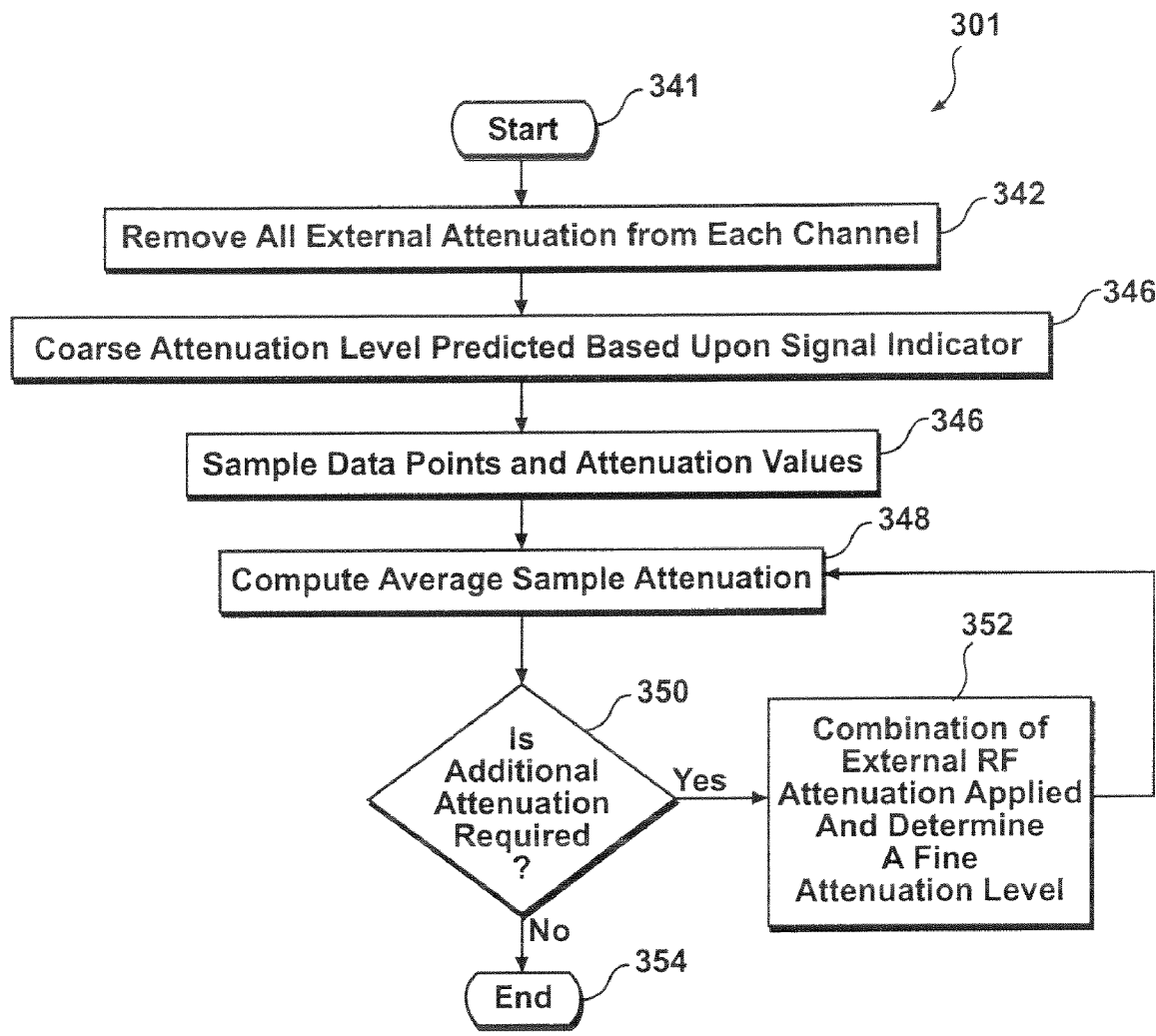
FIG. 4 is a flow chart diagram illustrating the configuration of the AGC for a single channel in accordance with an embodiment of the present invention.

FIG. 4 is a flow chart diagram illustrating an exemplarily method 301 of configuring the AGC of the node 12 for a single channel in accordance with one embodiment of the invention. The process starts 341 where the node 12 removes 342 all external attenuation from each channel in the list of channels. The node 12 then predicts 344 a coarse attenuation level based upon the signal indicator and then samples 346 the data points and the attenuation values. Over the same data points, the node 12 computes 348 an average sample attenuation and determines 348 if additional attenuation is required. If additional attenuation is required 350, then a combination of external RF attenuators is applied 352, and a fine attenuation level is determined. This application step 352 can also include the addition and subtraction of attenuation. The method 301 then again computes 348 average sample attenuation. However, if additional attenuation is not required 350, then the process ends 354. Thus, the method 301 configures the AGC of the node 12 for a single channel and must be repeated for each channel that is being sensed when the AGC of the node 12 is being configured as part of the hardware and/or software configuration of the node 12.

Thus, the present invention is directed to a method 20, method 200, and apparatus 10 of detecting and identifying spectrum opportunities, where the available channels are determined, and the user of channels is also determined. By also identifying the user of the channel, there is a reduction in the number of false alarms, such that a channel may be available even though there is a user transmitting a signal in the channel that would previously be identified as an unavailable channel. The apparatus 10 allows for the channel to be detected as being available even though a user is transmitting in the channel by identifying the user since the node 12 can co-exist or transmit over the user.

Further, the data transmitted in the list of channels includes data obtained by the base station 14 from other nodes 12 and the history of data obtained by nodes 12. Thus, the node 12 can determine how to scan the individual channels, configure the hardware and/or software for scanning the channels, and determine if the node 12 can use the channel while co-existing with another user or over another user. For example, and in no way limiting, the base station 14 can transmit to the node 12 a location of interferes, a list of available channels or frequencies, a list of available networks, allowable transmit power, achievable quality of service, other suitable data that the node 12 can use to determine if a channel is in use and the user of the channel, or a combination thereof. Based upon such data received by the node 12 from the base station 14, the node 12 can configure the hardware, configure the software, perform other desirable functions, or a combination thereof.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of detecting and identifying spectrum opportunities, the method comprising the steps of:
    communicating at least a location of at least one node to at least one base station;
    transmitting a list of at least one channel from the at least one base station to the at least one node;
    sensing the at least one channel from the list by the at least one node;
    determining if the at least one channel is in use;
    determining a user of each of the at least one channel that is in use; and
    when the at least one base station determines the user of one of the at least one channel that is being used, the at least one base station determines if the user is one of a licensed primary user, a licensed secondary user, and an unlicensed user; and
        if the user of the at least one channel is one of a secondary user and an unlicensed user, the node co-exists with the user in the at least one channel.

2. The method of claim 1 further comprising the step of determining soft information for the at least one channel by the at least one node, and transmitting the soft information from the at least one node to the at least one base station.

3. The method of claim 1 further comprising the step of the at least one base station assigning a signal indicator to each of the at least one channels, wherein the signal indicator is included in the transmission of the list of the at least one channel.

4. The method of claim 3 further comprising the step of the at least one node sorting the list of the at least one channel based upon the signal indicator.

5. The method of claim 1 further comprising the step of configuring at least one of the hardware or software of the at least one node for each of the at least one channel based upon the received list of the at least one channel.

6. The method of claim 1 further comprising the step of the at least one node using one of the at least one channel that is unused.

7. The method of claim 1 further comprising the step of the list of the at least one channel being based upon data the at least one base station received from a plurality of nodes of the at least one node and a history of data the at least one base station received from the plurality of nodes.

8. The method of claim 1 further comprising the step of a new node of the at least one node entering a network and in communication with the at least one base station, wherein the new node obtains the soft information from the at least one base station.

9. The method of claim 1 further comprising the step of communicating the velocity of the at least one node to the at least one base station.

10. A method of detecting and identifying spectrum opportunities, the method comprising the steps of:
    providing a plurality of nodes in communication with at least one base station;
    communicating a location and a velocity of each of the plurality of nodes to the at least one base station;
    determining a list of a plurality of channels by the at least one base station wherein the list includes a signal indicator associated with each of the plurality of channels;
    transmitting the list of the plurality of channels from the at least one base station to the plurality of nodes;
    sorting the plurality of channels based upon the signal indicator by each of the plurality of nodes;
    sensing the plurality of channels from the list by each of the plurality of nodes;
    configuring at least one of the hardware and software of each of the plurality of nodes for each of the plurality of channels based upon the signal indicator;
    determining soft information for the plurality of channels by the plurality of nodes;
    transmitting the soft information from the plurality of nodes to the at least one base station;
    determining if each of the plurality of channels are in use;
    determining a user for each of the plurality of channels that are in use and when the at least one base station determines the user of one of each of the plurality of channels that are being used, the at least one base station determines if the user is one of a licensed primary user, a licensed secondary user, and an unlicensed user; and if the user of one of the plurality of channels is one of a secondary user and an unlicensed user, one of the plurality of nodes co-exists with the user on the channel or uses the channel over the user.

11. The method of claim 10 further comprising the step of a node of the plurality of nodes using one of the plurality of channels that is unused.

12. An apparatus of detecting and identifying spectrum opportunities comprising:
at least one base station having at least a microprocessor, a transmitter, and a receiver; and
at least one node in communication with the at least one base station having at least a sensing device, a transmitter, and a receiver, wherein the transmitter of the at least one base station transmits a list of at least one channel that is received by the receiver of the at least one node, and the sensing device of the at least one node senses each of the at least one channel in order to determine soft information of the channel and the transmitter of the at least one node transmits the soft information which is received by the receiver of the at least one base station and processed by the microprocessor of the at least one base station; and
wherein said at least one node transmits a signal over one of the at least one channel being used by a user, such that the at least one node co-exists with the user or transmits over the user.

13. The apparatus of claim 12, wherein the at least one node sorts the at least one channel based upon a signal indicator.

14. The apparatus of claim 12, wherein at least one of the hardware and software of the at least one node is reconfigured for each of the at least one channel.

15. A method of detecting and identifying spectrum opportunities, the method comprising the steps of:
communicating at least a location of at least one node to at least one base station;
transmitting a list of at least one channel from the at least one base station to the at least one node;
sensing the at least one channel from the list by the at least one node;
determining if the at least one channel is in use;
determining a user of each of the at least one channel that is in use; and
when the at least one base station determines the user of one of the at least one channel that is being used, the at least one base station determines if the user is one of a licensed primary user, a licensed secondary user, and an unlicensed user; and
if the user of the at least one channel is one of a secondary user and an unlicensed user, the node uses the at least one channel over the user.

16. A method of detecting and identifying spectrum opportunities, the method comprising the steps of:
broadcasting at least a location of at least one node to at least one base station;
transmitting a list of at least one channel from the at least one base station to the at least one node;
sensing the at least one channel from the list by the at least one node; determining if the at least one channel is in use; identifying a user of each of the at least one channel that is in use; and
determining if the user is one of a licensed primary user, a licensed secondary user, and an unlicensed user; and
when the identified user is a licensed secondary user and an unlicensed user, the node either performing one of:
co-existing with the user in the at least one channel; and
using the at least one channel over the user.

* * * * *

UNITED STATES PATENT AND TRADEMARK OFFICE
CERTIFICATE OF CORRECTION

PATENT NO.        : 8,223,699 B2                                              Page 1 of 1
APPLICATION NO.   : 11/694808
DATED             : July 17, 2012
INVENTOR(S)       : Rao et al.

It is certified that error appears in the above-identified patent and that said Letters Patent is hereby corrected as shown below:

In Fig. 4, Sheet 4 of 4, delete " 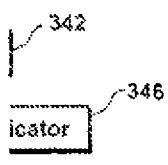 " and insert -- 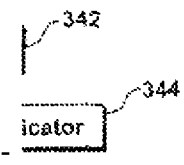 --, therefor.

Signed and Sealed this
Second Day of July, 2013

Teresa Stanek Rea
*Acting Director of the United States Patent and Trademark Office*